United States Patent
Glazer et al.

(10) Patent No.: US 9,317,131 B2
(45) Date of Patent: *Apr. 19, 2016

(54) SYSTEM AND METHOD FOR GENERATING A REPRESENTATIVE COMPUTERIZED DISPLAY OF A USER'S INTERACTIONS WITH A TOUCHSCREEN BASED HAND HELD DEVICE ON A GAZED-AT SCREEN

(71) Applicant: SCREENOVATE TECHNOLOGIES LTD., Raanana (IL)

(72) Inventors: Joshua Glazer, Raanana (IL); Gilad Yehiel Ben-Yossef, Rishon Le Zion (IL); Matan Shapira, Tel-Aviv (IL); Amit Zarfati, Kfar Saba (IL); Michael Herman, Ramat Gan (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,226

(22) Filed: Aug. 12, 2014

(65) Prior Publication Data

US 2014/0347308 A1 Nov. 27, 2014

Related U.S. Application Data

(63) Continuation of application No. 13/340,061, filed on Dec. 29, 2011, now Pat. No. 8,836,640.

(60) Provisional application No. 61/428,385, filed on Dec. 30, 2010.

(51) Int. Cl.
G06F 3/041 (2006.01)
G06F 3/01 (2006.01)
(Continued)

(52) U.S. Cl.
CPC .............. *G06F 3/017* (2013.01); *G06F 3/0488* (2013.01); *G06F 3/04845* (2013.01); *G06F 3/04883* (2013.01); *G08C 17/00* (2013.01); *G06F 2203/04808* (2013.01); *G08C 2201/93* (2013.01)

(58) Field of Classification Search
USPC .................................. 345/173, 156, 169, 174
See application file for complete search history.

(56) References Cited

U.S. PATENT DOCUMENTS 5,119,079 A 6/1992 Hube et al.
5,448,263 A 9/1995 Martin
(Continued)

FOREIGN PATENT DOCUMENTS

EP 1990707 A1 12/2008
WO 2006049506 A1 5/2006

OTHER PUBLICATIONS

McCallum et al., ARC-Pad: Absolute+Relative Cursor Positioning for Large Displays with a Mobile Touchscreen University of Manitoba Computer Science Dept., UIST'09, Oct. 4-7, 2009, Victoria, Brititsh Columbia.

(Continued)

*Primary Examiner* — Thuy Pardo
(74) *Attorney, Agent, or Firm* — Browdy and Neimark, PLLC

(57) ABSTRACT

A system and method of interacting with a smartphone application displayed over a remote display gazed at by a user including a normal mode of operation which may be the default, a hovering mode of operation which may be triggered by a trigger event, and a release event which reverts from hovering mode to normal mode. An enhanced hovering ability is typically provided while hovering, in that a predetermined set of operative gestures is enabled, such that a range of predetermined gestures is available for operating purposes while hovering.

35 Claims, 7 Drawing Sheets

(51) Int. Cl.
*G06F 3/0488* (2013.01)
*G08C 17/00* (2006.01)
*G06F 3/0484* (2013.01)

(56) References Cited

U.S. PATENT DOCUMENTS

| | | | |
|---|---|---|---|
| 6,954,355 | B2 | 10/2005 | Gerstner et al. |
| 7,109,975 | B2 | 9/2006 | Fedorak et al. |
| 7,199,787 | B2 | 4/2007 | Lee et al. |
| 7,870,496 | B1 | 1/2011 | Sherwani |
| 8,031,175 | B2 | 10/2011 | Rigazio et al. |
| 8,487,865 | B2 | 7/2013 | Refai et al. |
| 2002/0190920 | A1 | 12/2002 | Kung |
| 2008/0192068 | A1 | 8/2008 | Refai et al. |
| 2009/0239587 | A1 | 9/2009 | Negron et al. |
| 2010/0045611 | A1 | 2/2010 | Nelson et al. |
| 2010/0156813 | A1 | 6/2010 | Duarte et al. |
| 2011/0161845 | A1 | 6/2011 | Stallings et al. |
| 2011/0191516 | A1 | 8/2011 | Xiong et al. |
| 2011/0316790 | A1* | 12/2011 | Ollila et al. .................. 345/173 |
| 2012/0017152 | A1 | 1/2012 | Matsuda et al. |
| 2012/0212438 | A1* | 8/2012 | Vaisanen ..................... 345/173 |
| 2014/0267121 | A1* | 9/2014 | Luo ..................... G06F 3/0416 345/173 |
| 2015/0363038 | A1* | 12/2015 | Luo ..................... G06F 3/0488 345/173 |

OTHER PUBLICATIONS i-Pointer_lower quality—YouTube, retrieved Oct. 30, 2013 from <<http:/www.youtube.com/watch?v+Wvx14M_PGao>>, uploaded Sep. 20, 2010.
iTunes Preview, Pointer by Karmeye, retrieved Oct. 30, 2013 from <<http:/itunes.apple.com/us/pointer/id424823677?mt=8>>, updated Nov. 20, 2012.

* cited by examiner

SYSTEM AND METHOD FOR GENERATING A REPRESENTATIVE COMPUTERIZED DISPLAY OF A USER'S INTERACTIONS WITH A TOUCHSCREEN BASED HAND HELD DEVICE ON A GAZED-AT SCREEN

TECHNICAL FIELD

The present invention relates generally to touch screen applications and more particularly to touch screen applications which interact with an external display.

BACKGROUND ART

Conventional technology pertaining to certain embodiments of the present invention is described in the following publications inter alia:

EP 199090707 describes a dual function touch screen for a portable consumer electronics device, including computing a touch location signal and displaying a resulting cursor track signal.

U.S. Pat. No. 7,199,787 to Lee describes a touch screen and a method for generating a display via an external display device, including recognizing a touch pad location selected by a user and displaying a position on the external display, accordingly.

U.S. Pat. No. 7,870,496 describes a touchscreen remotely controlling a host computer in which the cursor is kept in the center of the display except when a center of a selected portion of a host image is close to an edge of the host image.

The user interface of current generation of hand held consumer electronic devices (such as smart phones and media players) is touch driven. An emerging trend in this area is the remoting of the user interface display of these devices onto external surfaces (either walls or screens) thus allowing the user to hold a consumer electronics (CE) device at a distance from the actual display. This may be done by the use of pico projectors, HDMI or DVI cables, or wireless video streaming technologies to stream the UI (user interface) of the CE device onto a computer or a media streamer connected to a TV. In addition, combinations and variations of the above are also possible, such as a physical HDMI connection to a third party device that transmits the video stream produced by the hand held device over a Wifi connection.

The user of the hand held device may interact with the device UI (user interface) using the touch interface, by putting one or more fingers on the touch screen and performing various gestures.

Existing technology includes using equipment either connected externally to the CE device (e.g. external mouse, keyboard or joystick) or already embedded in the CE device (such as DPAD or the SurePress technology of BlackBerry® Storm™). These devices may provide an image (such as mouse pointer) hovering above the place where the interaction may happen. Other instances of existing technology use depth sensing technologies in order to detect a finger/s before they touch the display and provide a visual indication of the location of the touch.

The disclosures of all publications and patent documents mentioned in the specification, and of the publications and patent documents cited therein directly or indirectly, are hereby incorporated by reference.

SUMMARY OF INVENTION

Certain embodiments of the present invention seek to provide a system and method of interacting with a smartphone application displayed over a remote display gazed at by a user including a normal mode of operation which may be the default, a hovering mode of operation which may be triggered by a trigger event, and a release event which reverts from hovering mode to normal mode. An enhanced hovering ability is typically provided while hovering, in that a predetermined set of operative gestures is enabled, such that a range of predetermined gestures is available for operating purposes while hovering.

Certain embodiments of the present invention pertain to user interaction with an image displayed on a screen.

Certain embodiments of the present invention seek to resolve this inconvenience to the user, enabling her or him to look only at the remote display, without the need to look at the touchscreen of the CE device.

Certain embodiments of the present invention seek to provide a completely programmatic embodiment including a method and system which use only the multi touch sensing capability of the touchscreen embedded in a CE device, without providing additional hardware and instead only altering the software of the CE device.

According to certain embodiments of the present invention a hovering mode is added to the normal operational, also termed herein "native" or "touchscreen" mode of the user interface of a handheld CE device which is paired with an external, typically larger screen such as a TV or computer screen, such that the larger screen is displaying the image received from the handheld CE device.

In a typical embodiment, the hovering mode is implemented as additional computer software added to the conventional CE device code that handles the reading and handling of touch screen events from the hardware and dispatching it to higher levels of code in the CE device operating system. In the hovering mode, the user moves one or more interaction elements, e.g. his own finger/s (similar to mouse pointer on a computer screen). An ongoing sensory cue regarding the position of the element/s e.g. finger/s is provided to the user such that s/he need not gaze at the screen of the CE device. When the user wants to interact conventionally with the CE device (such as clicking a button, or performing a gesture) the user so indicates, e.g. as described below, and then the hovering mode is interrupted to enable the user to interact conventionally with the CE device.

Certain embodiments of the present invention seek to provide a system and method for entering the hovering mode from the CE device's normal touchscreen mode, e.g. by effecting a trigger event.

Certain embodiments of the present invention seek to provide a system and method for providing a sensory cue indicating the location of the pointing element/s e.g. finger/s while in hovering mode given that the user moves the pointing element/s e.g. finger/s while in hovering mode.

Certain embodiments of the present invention seek to provide a system and method for the user to interact with the underlying interface while in hovering mode.

Certain embodiments of the present invention seek to provide a system and method for native interface elements to know that the interaction element/s e.g. finger/s is hovering above. For example, in an Android system, the View that is focused at the location the finger is hovering above, may receive an onTouchEvent or onClickEvent call. According to certain embodiments a passive interaction with the underlying interface may also be effected in hovering mode, such as when the visual cue (e.g. red circle) hovers above a particular native interface element. For example, in an Android system, the underlying view may receive a onHoverEvent if an appropriate Listener is registered with the Android system.

Certain embodiments of the present invention seek to provide a system and method for exiting from hovering mode back to the CE device's normal touchscreen mode, e.g. by effecting a release event.

According to certain embodiments, entering the hovering mode includes pressing a special button on the CE device (such as but not limited to a long press on a volume key or camera key) and touching the touchscreen during the following predetermined time period e.g. at least two seconds.

According to certain embodiments, a visual cue may be provided e.g. in the shape of a red circle in the last place the circle was when the hovering mode was exited, or in a predetermined location e.g. the center of the screen if this is the first time the hovering mode is entered.

When a finger is moved on the touchscreen the visual cue may move X inches for every Y pixels that the finger is moved on the screen.

Lifting the finger for a period of less than (say) 2 seconds may leave the red circle (e.g.) in the same place, and the CE device remains in hovering mode. Placing the finger on the touchscreen again does not alter the visual cue's position.

According to certain embodiments, interacting with the underlying interface is triggered by performing some gesture with an additional finger. This gesture may for example include tapping, e.g. as shown in FIG. 3b, at a designated location on the screen, typically in a manner which is unique hence avoids conflict with conventional touch events, or some other gesture may be performed such as swiping. The interaction will be recorded at the location of the red circle, and not at the tapped location. Typically, the interaction at the tapped location will be regarded as a finger touch on the touchscreen at the location of the red circle. For example, in Android systems the View that is focused in the location of the red circle may receive an onTouchEvent or onClickEvent call.

Any suitable method may be employed to detect the tapping gesture, which may, for example, include some or all of the following operations: monitor entire touch screen, or only screen locations adjacent touch locations, for taps conforming to a predetermined range of tap-defining time intervals; identify tap at location x, open a tapping gesture; find and output touched location adjacent to location x; and monitor for end of tapping gesture by monitoring time intervals between taps and comparing to predetermined range of tap-defining time intervals; when ends, close tapping gesture opened previously. One method for detecting a tapping gesture may include some or all of the steps illustrated in FIG. 6, suitably ordered e.g. as shown.

According to certain embodiments, the button (or any other graphical user interface element) might change its shape or color when the interaction element/s e.g. finger/s hovers above that button (i.e. touches the screen at the button's location).

According to certain embodiments, exiting the hovering mode is triggered by pressing a special button on a CE device, by lifting all fingers from the touchscreen for more than (e.g.) two seconds, or by performing a unique touch gesture such as but not limited to those described below.

Pure software solutions exist which perform the task of displaying a visual cue indicative of user's interactions with a handheld touch screen, at the application level. These solutions render the displayed content themselves and then overlay the visual cue on top. A particular disadvantage of these solutions is that they are restricted to those file types that can be rendered by the application. For example, an image requires a different rendering mechanism than a pdf document does; the application may not handle both. These applications are usually slower than the native viewer (which is usually hardware accelerated) for the same file types. In contrast, according to certain embodiments of the current invention, the visual cue image is not handled at the application level and instead is appended to a lower software layer comprising already rendered surfaces of the displayed file. Thereby, the visual cue becomes independent of the displayed interface including the file type thereof, and rendering is entrusted to the native applications.

A particular advantage of certain embodiments is the following: when a CE device is used by itself without using an external display, during usage of a touch interface as an input device, the location of the finger used for input is within the user's natural field of vision. But when the user interacts with the CE device using a touch interface while looking at a remote display, this is no longer true and the user has no feedback where his or her fingers are on the touch interface, forcing the user to shift his or her gaze from the CE device to the remote display and back many times.

It is appreciated that typically, as shown in FIGS. 1a-1c, video content shown on a larger, external or even remote screen such as a TV screen, is identical to that displayed by, and is provided by, the hand held touch screen device (e.g. CE device) via a suitable connection which may be wired or wireless. Any suitable technology, including but not limited to picoprojector or Wifi technology, may be employed to implement this arrangement.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/ or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

In accordance with an aspect of the presently disclosed subject matter, there is provided a method for interacting with a smart phone application, the method being operative in conjunction with an external digital display having a gazed-at display screen, on which a first image is provided which is based on another image produced by a touchscreen based hand held device, the method including: in a first, normal, default mode of operation, sensing a user's interactions with the touchscreen based hand held device and modifying a display on the touchscreen based hand held device accordingly; in a second, hovering, mode of operation, triggered by a trigger event and terminated by a release event; sensing the user's interactions with the touchscreen based hand held device and generating a representative display of the user's interactions superimposed on the first image; and detecting at least one predetermined compound touch event generated by the user's interaction with the touchscreen, including a first touch event component indicative of a touchscreen location and a second touch event component indicative of an operative action to be performed within the normal mode of operation, and performing the operative action indicated by the second touch event component at the touchscreen location indicated by the first touch event component.

In accordance with an embodiment of the presently disclosed subject matter, there is further provided a method wherein said generating a representative display includes providing an indication, on a display device controlling the gazed-at screen, of at least one finger location on the touchscreen based hand held device thereby allowing a user to generate touch screen events which control the display device's display output.

In accordance with an embodiment of the presently disclosed subject matter, there is further provided a method wherein the providing an indication occurs only responsive to a trigger event initiated by the user of the touch screen and wherein the trigger event comprises at least one touch screen event representing a touch gesture in which the user touches the touch screen.

In accordance with an embodiment of the presently disclosed subject matter, there is further provided a method, where the touch gesture comprises placing two fingers on the touch screen at any location, followed by a drag of only one finger.

In accordance with an embodiment of the presently disclosed subject matter, there is further provided a method, where the touch gesture comprises swiping two fingers in vertical movement in opposite directions.

In accordance with an embodiment of the presently disclosed subject matter, there is further provided a method, where the touch gesture comprises dragging a single finger from a predetermined location on a touchscreen.

In accordance with an embodiment of the presently disclosed subject matter, there is further provided a method, where the release event comprises a press of one of the CE device physical buttons.

In accordance with an embodiment of the presently disclosed subject matter, there is further provided a method, where the release event comprises a touch gesture in which the user touches the touch screen.

In accordance with an embodiment of the presently disclosed subject matter, there is further provided a method, where the touch gesture comprises lifting all fingers from the touch screen.

In accordance with an embodiment of the presently disclosed subject matter, there is further provided a method, where the touch gesture comprises placing an additional finger on the touch screen in any location.

In accordance with an embodiment of the presently disclosed subject matter, there is further provided a method, wherein generating a representative display comprises displaying a visual cursor overlay upon the normal display of the CE device in question which is visible on the external gazed at surface.

In accordance with an embodiment of the presently disclosed subject matter, there is further provided a method, where at least one characteristic of the visual cursor provides a characterization of the touch surface of at least one finger with the touch screen.

In accordance with an embodiment of the presently disclosed subject matter, there is further provided a method, where the visual cursor is drawn by the apparatus used to render the remote display of the hand held device.

In accordance with an embodiment of the presently disclosed subject matter, there is further provided a method, where the visual cursor is drawn using a display device which is additional to the display device rendering the main remote display of the hand held device.

In accordance with an embodiment of the presently disclosed subject matter, there is further provided a method, wherein generating a representative display comprises generating an audio sound, sensible to the user, of the at least one characteristic of which indicates to the user the relative location of his finger on the touch screen.

In accordance with an embodiment of the presently disclosed subject matter, there is further provided a method, wherein generating a representative display comprises generating a haptic indication, sensible to the user, of the location of at least one finger on the touch screen.

In accordance with an embodiment of the presently disclosed subject matter, there is further provided a method wherein the location of at least one finger comprises locations of each of a plurality of fingers upon the touch screen.

In accordance with an embodiment of the presently disclosed subject matter, there is further provided a method wherein the characteristic of the visual cursor includes the shape thereof.

In accordance with an embodiment of the presently disclosed subject matter, there is further provided a method wherein the characteristic of the visual cursor includes the color thereof.

In accordance with an embodiment of the presently disclosed subject matter, there is further provided a method wherein the characterization of the touch surface includes the size thereof.

In accordance with an embodiment of the presently disclosed subject matter, there is further provided a method wherein the characterization of the touch surface includes the angular orientation thereof.

In accordance with an embodiment of the presently disclosed subject matter, there is further provided a method, where the trigger event comprises a key press.

In accordance with an embodiment of the presently disclosed subject matter, there is further provided a method where the CE device comprises a smart phone.

In accordance with an embodiment of the presently disclosed subject matter, there is further provided a method where the CE device comprises a media player.

In accordance with an embodiment of the presently disclosed subject matter, there is further provided a method wherein the characteristic includes at least one of: pitch, height and volume.

In accordance with an embodiment of the presently disclosed subject matter, there is further provided a method wherein the generating a representative display includes providing an indication, on a display device controlling the gazed-at screen, of at least one finger location on the touch-screen based hand held device thereby allowing a user to generate touch screen events which control the display device's display output.

In accordance with an embodiment of the presently disclosed subject matter, there is further provided a method wherein the providing an indication occurs only responsive to a trigger event initiated by the user of the touch screen.

In accordance with an embodiment of the presently disclosed subject matter, there is further provided a method wherein the trigger event comprises at least one touch screen event representing a touch gesture in which the user touches the touch screen.

In accordance with an embodiment of the presently disclosed subject matter, there is further provided a method comprising sniffing for the trigger event while passing all touch screen events, other than the trigger event, for touch screen event processing toward modification of the display output.

In accordance with an embodiment of the presently disclosed subject matter, there is further provided a method including, responsive to the trigger event, grabbing all touch events generated by the user on the touch screen during a time period, and for each of the touch events, providing a sensory cue for location of at least one finger upon the touch screen.

In accordance with an embodiment of the presently disclosed subject matter, there is further provided a method including, responsive to the trigger event, blocking all touch events generated by the user on the touch screen during a time period, for touch screen event processing toward modification of the display output.

In accordance with an embodiment of the presently disclosed subject matter, there is further provided a method wherein the time period terminates upon occurrence of a release event.

In accordance with an embodiment of the presently disclosed subject matter, there is further provided a method wherein the release event comprises at least one touch screen event representing a touch gesture in which the user touches the touch screen.

In accordance with an embodiment of the presently disclosed subject matter, there is further provided a method wherein the operative action comprises a selected one of a range of predetermined operative actions.

In accordance with an embodiment of the presently disclosed subject matter, there is further provided a method wherein the sensing includes detecting a gesture in which a plurality of fingers contact the touchscreen and, within a predetermined time interval, some of the plurality of fingers are removed from the touchscreen whereas others of the plurality of fingers remain in contact with the touchscreen.

In accordance with an embodiment of the presently disclosed subject matter, there is further provided a method wherein the representative display comprises a visual cue indicative of location of the user's interaction and wherein an initial position of the visual cue on the first image is exactly the initial position of the user's interaction on the touch screen, suitably scaled to take into account difference in size between the touch screen and the gazed-at screen.

In accordance with an embodiment of the presently disclosed subject matter, there is further provided a method wherein the representative display comprises a visual cue indicative of location of the user's interaction and wherein an initial position of the visual cue on the first image is predetermined irrespective of the initial position of the user's interaction on the touch screen.

In accordance with an embodiment of the presently disclosed subject matter, there is further provided a method wherein the visual cue moves in each dimension to exactly reproduce the user's motions over the touchscreen, scaled to take into account difference in size between the two screens.

In accordance with an embodiment of the presently disclosed subject matter, there is further provided a method wherein the visual cue moves in each dimension to exactly reproduce the user's motions over the touchscreen, scaled by predetermined visual cue speed factors irrespective of difference in size between the two screens.

In accordance with an aspect of the presently disclosed subject matter, here is yet further provided a system for adding a mode of operation to any of a population of applications for at least one touchscreen based hand held device each having a normal mode of operation which includes sensing a user's interactions with the touchscreen based hand held device and modifying a display on the touchscreen based hand held device accordingly, the system comprising a software development functionality operative to add a hovering mode of operation to any of a population of applications for at least one touchscreen based hand held device, wherein the hovering mode of operation includes sensing the user's interactions with the touchscreen based hand held device and generating a representative display of the user's interactions superimposed on a first image displayed on an external display device.

In accordance with an embodiment of the presently disclosed subject matter, there is yet further provided a system wherein the software development functionality is part of an SDK (Software development kit).

In accordance with an embodiment of the presently disclosed subject matter, there is yet further provided a system wherein the software development functionality includes a library of trigger events, and a trigger event selection functionality operative to enable an application developer to select an individual trigger event from the library and to configure the application to pass from its normal mode of operation to the hovering mode of operation responsive to the individual trigger event selected.

In accordance with an embodiment of the presently disclosed subject matter, there is yet further provided a system wherein the software development functionality includes a library of release events, and a trigger event selection functionality operative to enable an application developer to select an individual release event from the library and to configure the application to revert from the hovering mode of operation to its normal mode of operation responsive to the individual release event selected.

In accordance with an embodiment of the presently disclosed subject matter, there is yet further provided a system wherein at least one event in the library of trigger events comprises a gesture.

In accordance with an embodiment of the presently disclosed subject matter, there is yet further provided a system wherein at least one event in the library of release events comprises a gesture.

In accordance with an embodiment of the presently disclosed subject matter, there is yet further provided a system wherein the software development functionality includes a library of cues indicating a location on a screen display; and a cue selection functionality operative to enable an application developer to select an individual cue from the library and to configure the application to generate, responsive to sensed user's interactions with the touchscreen based hand held device, a representative display of the user's interactions, including the individual cue. In accordance with an embodiment of the presently disclosed subject matter, there is yet further provided a system wherein the individual cue includes a visual cue.

In accordance with an embodiment of the presently disclosed subject matter, there is yet further provided a system wherein the visual cue is superimposed on a first image displayed on an external display device, at a location representative of a location of the sensed user's interactions relative to the touchscreen based hand held device.

In accordance with an embodiment of the presently disclosed subject matter, there is yet further provided a system wherein the cue selection functionality is also operative to enable an application developer to select one of: a relative mode of movement of the visual cue; and an absolute mode of movement of the visual cue.

In accordance with an embodiment of the presently disclosed subject matter, there is yet further provided a method wherein the hovering mode of operation is implemented in an Android system.

In accordance with an embodiment of the presently disclosed subject matter, there is yet further provided a method wherein the second, hovering, mode of operation is implemented on a Wi-Fi display.

In accordance with an embodiment of the presently disclosed subject matter, there is yet further provided a method wherein an underlying view receives an onHoverEvent if an appropriate Listener is registered with the Android system.

In accordance with an embodiment of the presently disclosed subject matter, there is yet further provided a method wherein the first image is displayed remotely.

In accordance with an embodiment of the presently disclosed subject matter, there is yet further provided a method wherein the gazed-at screen comprises a television screen.

In accordance with an embodiment of the presently disclosed subject matter, there is yet further provided a method wherein software functionality residing in the hand-held device implements the second, hovering, mode of operation.

In accordance with an embodiment of the presently disclosed subject matter, there is yet further provided a system wherein the hovering mode of operation gives the user a cue to the place at which his fingers are, without performing any interaction with the interface of the handheld device.

In accordance with an aspect of the presently disclosed subject matter, there is yet further provided a method for interacting with an image, the method being operative in conjunction with a gazed-at screen, on which a first image is provided which is based on another image produced by a touchscreen based hand held device, the method including: in a first, normal, mode of operation, sensing a user's interactions with the touchscreen based hand held device and modifying a display on the touchscreen based hand held device accordingly; in a second, hovering, mode of operation, sensing the user's interactions with the touchscreen based hand held device and generating a representative display of the user's interactions superimposed on the first image; and upon detecting a predetermined compound touch event generated by the user's interaction with the touchscreen, passing from one of the modes of operation to another, the compound touch event including a first event component indicating a location on the touchscreen and a predetermined second event component which a user is capable of generating concurrently with the first event component, the predetermined second event being reserved to trigger passage between the modes of operation.

In accordance with an embodiment of the presently disclosed subject matter, there is yet further provided a method wherein an interface displayed on the hand held device is unaware of the second hovering mode of operation and interacts with the second hovering mode of operation as though it were the first mode of operation.

In accordance with an embodiment of the presently disclosed subject matter, there is yet further provided a method and also comprising sniffing for the trigger event while passing all touch screen events, other than the trigger event, for touch screen event processing toward modification of the display output.

In accordance with an embodiment of the presently disclosed subject matter, there is yet further provided a method and also including, responsive to the trigger event, grabbing all touch events generated by the user on the touch screen during a time period, and for each of the touch events, providing a sensory cue for location of at least one finger upon the touch screen.

In accordance with an embodiment of the presently disclosed subject matter, there is yet further provided a method including, responsive to the trigger event, blocking all touch events generated by the user on the touch screen during a time period, for touch screen event processing toward modification of the display output.

In accordance with an embodiment of the presently disclosed subject matter, there is yet further provided a method wherein the time period terminates upon occurrence of a release event.

In accordance with an embodiment of the presently disclosed subject matter, there is yet further provided a method wherein the release event comprises at least one touch screen event representing a touch gesture in which the user touches the touch screen.

In accordance with an aspect of the presently disclosed subject matter, there is yet further provided a system for interacting with a smart phone application, the system being operative in conjunction with an external digital display having a gazed-at display screen, on which a first image is provided which is based on another image produced by a touchscreen based hand held device, the system interacting with a native interface operative, in a first, normal, default mode of operation of the hand held device, for sensing a user's interactions with the touchscreen based hand held device and modifying a display on the touchscreen based hand held device accordingly, the system comprising: a virtual hovering hovering operative, in a second, hovering, mode of operation of the hand held device, triggered by a trigger event and terminated by a release event, for sensing the user's interactions with the touchscreen based hand held device and generating a representative display of the user's interactions superimposed on the first image; and for detecting at least one predetermined compound touch event generated by the user's interaction with the touchscreen, including a first touch event component indicative of a touchscreen location and a second touch event component indicative of an operative action to be performed within the normal mode of operation, and performing the operative action indicated by the second touch event component at the touchscreen location indicated by the first touch event component.

In accordance with an aspect of the presently disclosed subject matter, there is yet further provided a computer program product, comprising a computer usable medium having a computer readable program code embodied therein, the computer readable program code adapted to be executed to implement a method for interacting with a smart phone application, the method being operative in conjunction with an external digital display having a gazed-at display screen, on which a first image is provided which is based on another image produced by a touchscreen based hand held device, the method including: in a first, normal, default mode of operation, sensing a user's interactions with the touchscreen based hand held device and modifying a display on the touchscreen based hand held device accordingly; in a second, hovering, mode of operation, triggered by a trigger event and terminated by a release event: sensing the user's interactions with the touchscreen based hand held device and generating a representative display of the user's interactions superimposed on the first image; and detecting at least one predetermined compound touch event generated by the user's interaction with the touchscreen, including a first touch event component indicative of a touchscreen location and a second touch event component indicative of an operative action to be performed within the normal mode of operation, and performing the operative action indicated by the second touch event component at the touchscreen location indicated by the first touch event component.

BRIEF DESCRIPTION OF DRAWINGS

in FIG. 3b inter alia, a black (or hatched) circle denotes a location on which a long press is applied by the user's finger/s while a white circle denotes a location on which a short tap is applied by the user's finger/s.

MODES FOR CARRYING OUT THE INVENTION

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

Figure 1A:
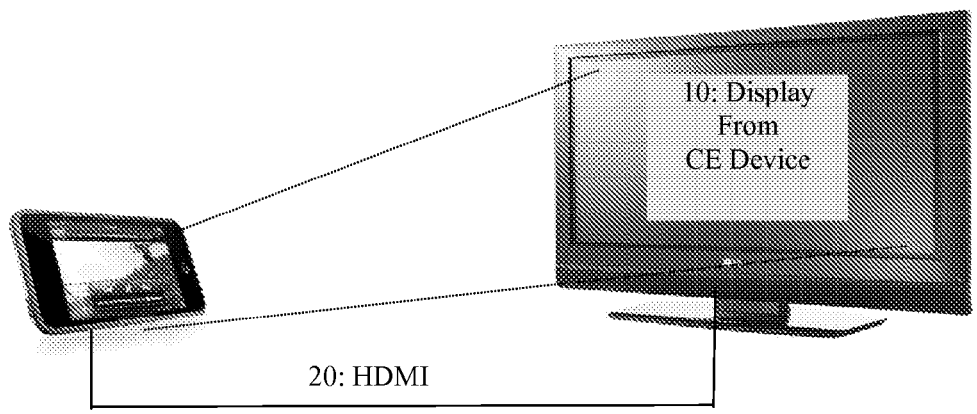
FIGS. 1a-1c are simplified pictorial illustrations of apparatus useful in conjunction with the methods of the present invention.
Figure 1B:
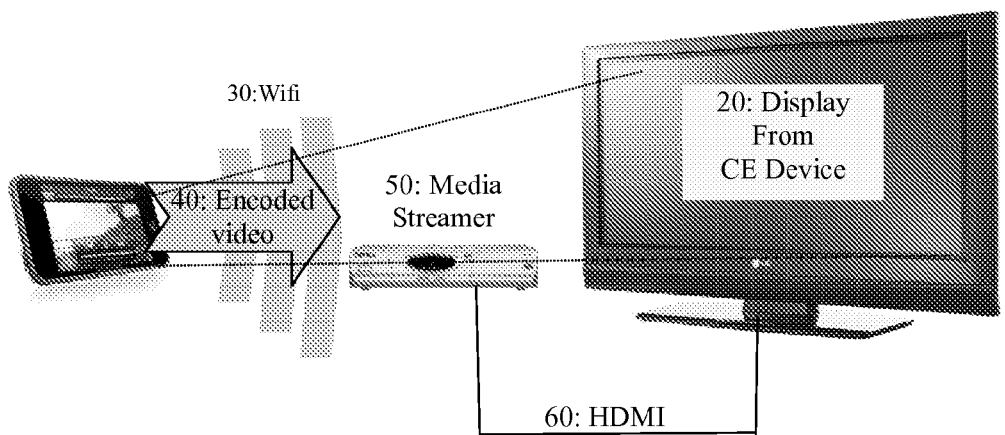
Figure 1C:
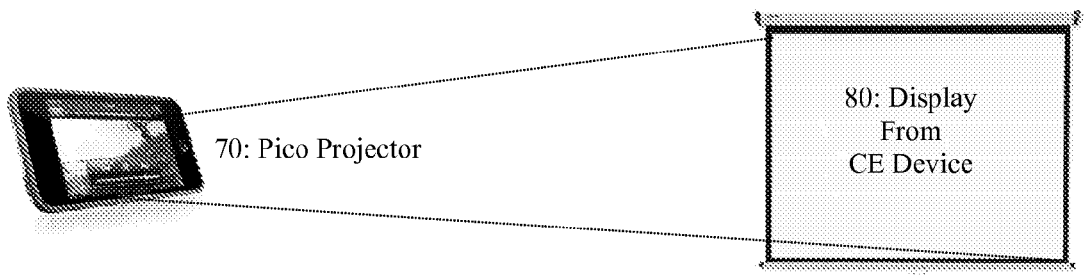
Figure 2:
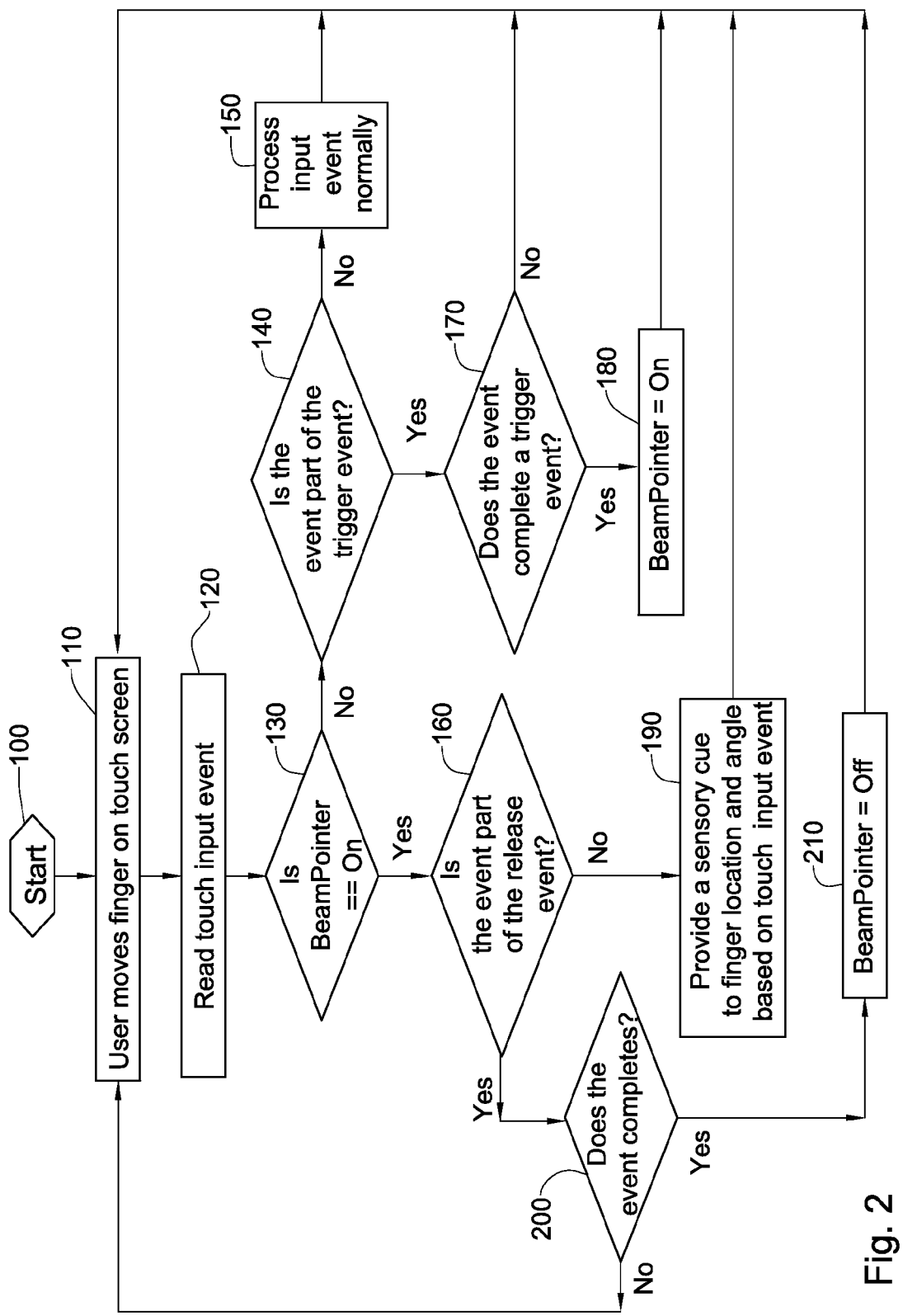
FIG. 2 is a simplified flowchart illustration of a method for providing a sensory cue representing an interaction with a touch screen based interface.

Reference is now made to FIGS. 1a-1c which illustrate apparatus useful in conjunction with the methods of the present invention and to generally self-explanatory FIG. 2 which illustrates a method for providing a sensory cue for the position of digits in a touch screen based interface provided in accordance with certain embodiments of the present invention. Generally, the user interface of the current generation of hand held consumer electronic devices 5 (henceforth "hand held devices"), such as smart phones and media players, is touch driven. An emerging trend in this area is the beaming or remoting of the user interface display of these devices onto external displays 10, such as by the use of pico projectors 70, use of HDMI connectors 20, or use of video streaming technologies to stream the UI of the CE device 5 into a media streamer connected to a TV 20.

An emerging problem for designers of new CE devices, resulting from these two trends, is that while the physical screen of the CE device is used as a touch input device, the location of the finger or fingers used for touch input is naturally visible to the person interacting with the CE device, while when the user interacts with the CE device using a touch interface while looking at a remote display, this is no longer true, and the user has no feedback where his or her fingers are on the touch interface, forcing the user to shift his or her gaze from the CE device to the remote display and back many times. This is intrusive to the user's concentration and is therefore undesirable.

In a typical implementation, a hand held device 5, such as a smart phone or personal media device, is equipped with an embedded display (a screen) which supports touch events as an input mechanism.

In a typical implementation, the same hand held device also supports some means of displaying its user interface or a remote display. This remote display may show a replica of the embedded display or a different UI or content.

In a favorable implementation, the means of the hand held device for displaying its display remotely allows the user to hold the hand held device at a distance from the actual display 10. This can be done, for example, via the use of pico projectors that are internally part of some hand held devices today, or by use of technology to transmit via wireless a video stream of the display to remote TV or video streamer as a compressed video stream (encoded MPEG4 stream over UDP over Wifi, for example).

In other implementations, the means of the hand held device 5 to provide the remote display 10 involves a physical connection, such as an HDMI connector from the phone attached to the display. In addition, combinations and variations of the above are also possible, such as a physical HDMI connection to a third party device that transmits the video stream produced by the hand held device over a wireless connection.

In a typical implementation, the user of the hand held device will interact with the device UI using the touch interface, by putting one or more fingers on the touch screen and performing various movements, or gestures, to indicate to the device the operations required by the device user.

In a typical implementation, the hand held device will be set up to display its user interface remotely as described above. The user will then put his or her eyes on the remote display and perform the trigger event to engage the system. The user will then interact with the system by moving his/her finger across the touch screen and receiving a sensory cue notifying him where his/her finger is located. The interaction will end when the user performs the release event.

In a typical implementation, the system will be implemented as additional computer software code that will be added to the code that handles the reading and handling of touch screen events from the hardware and dispatching it to higher levels of code in the system.

Such code typically reads touch events created by the touch screen hardware and, based on some logic, notifies higher layers of code that a touch, a swipe or other gesture have been received. In this typical implementation, this gesture detection and event relay logic will be expanded to include the detection of the trigger event, as well as the additional behavior outlined as follows.

In some implementations this trigger even might be pressing of a key designated for this function in a specific context on the hand held device.

In another implementation, the user of the hand held device will perform a touch gesture to engage the system. This implementation is very easy for the user, but requires an additional button on the hand held device.

In some implementations, the gesture is comprised of putting of two fingers on the touch screen, and then lifting one finger, while continuing to press the other finger onto the touch screen. This implementation is relatively easy for the user, but it is possible that the trigger event will make it difficult to implement other common touch UI gestures, such as pinch and zoom.

In other implementations, the gesture is comprised of simply putting a single finger on the touch screen. This implementation is very easy for the user, but requires the user to adjust to a different meaning of touch gesture when using a remote display and otherwise, as commonly putting a finger on a touch display is reserved to a different action (click, swipe or drag) in many existing touch user interface implementations.

In one implementation, the gesture will be comprised of putting two fingers on the touch screen and swiping each one horizontally in opposite directions to each other. This implementation has the advantage of not requiring additional keys on the touch device, while at the same time not requiring changing the meaning of common gestures commonly used in touch based user interface implementations.

Once the trigger event has been registered by the system, the system will start providing a sensory cue for the location of the finger on the touch screen to the hand held user. This will be done by the program code creating a sensory stimulus for the hand held device user such as the nature of the stimulus is tied to the location, and optionally other parameters related to the finger or fingers of the user on the touch screen.

In a typical implementation, the sensory stimulus is visual—the system will add a visual cursor on top of the display corresponding to the location of the finger or fingers on the touch screen display. In some implementations the visual cursor might be translucent, thus allowing to user to see the display underneath, or it might be opaque. The visual cursor might have any shape, such as, for example, a cross, a hand, an arrow or a point.

In a typical implementation of this sort, the visual cursor will be drawn using the same mechanism that is used to draw the remote display, that is, the system will instruct the part of the software of the hand held device that is responsible to draw the screen, to overlay the visual cursor on top of the display. In such an implementation, the cursor will be displayed by whatever mechanism that is drawing the remote display, for example a pico projector, video streaming or HDMI output, as the case may be.

In other implementations, the visual cursor may be overlaid on top of the remote display by a different mechanism than is used to draw the remote display itself An example of such an implementation would be the projecting of a visual cursor using a secondary pico projector, synchronized to the main pico projector that is rendering the main remote display of the hand held device.

In one implementation, the touch screen sensor may report additional information, in addition to the location of the finger or fingers on the touch screen. Such information can include, for example, the size of the finger press and the angle of the finger. This additional information can be used to display a visual cursor whose exact shape and size change to reflect the exact size and angle of the finger on the touch screen.

In another possible implementation, the sensory stimulus is auditory—once engaged, the system will generate a sound, whose properties, such as pitch, tempo or volume, change in response to the location of the finger on the touch screen.

As an example, one possible implementation may encode the distance of the finger from the top of the touch screen in the pitch of the sound, while the distance from the leftmost side of the screen is encoded in the volume of the sound. In this implementation, pressing a finger on the left top corner of the screen will produce a low volume high pitched sound, while moving a finger along the touch screen diagonal will raise the sound volume and lower its pitch, accordingly.

In yet another implementation, the sensory stimulus is haptic—once engaged, the system uses a mechanical vibrator built into the hand held device to convey, via haptic feedback, the location of the finger on the touch screen.

As an example, one possible implementation may encode the location of the finger on the touch screen, as a series of pairs of vibrations, separated by a pause. The length of the first vibration corresponds to the distance of the finger from the top of the touch screen, whereas the length of the second vibration that follows in the set corresponds to the distance of the finger from the left-most side of the touch screen.

In such an implementation as described above, holding a finger on the top left corner of the touch screen will result in a series of two long successive vibrations followed by a pause, where sliding a finger towards the right most side of the screen, while keeping its relative position to the top of the screen, will result in a series of vibrations to gradually change into pairs of long and short vibrations, followed by a pause— the first long vibration indicating that the finger is at the top of the screen, whereas the following vibration that gets shorter and shorter as one moves one's finger as described, indicates that the finger position is approaching the right-most side of the touch screen.

Many other implementations can be described using combinations and variations of the various sensory inputs described above.

When the user of the hand held device has decided to perform an operation with the touch screen (such as click an icon, perform a drag or pinch operation), he needs to disengage the system. This is done by the user providing the release event.

In one implementation, this release event may be the pressing of a key on the hand held device that is dedicated to this function in this context.

In another implementation, the hand held user may perform a touch screen gesture, such as the release event.

One possible implementation of this release event gesture may be the user lifting all fingers off the touch screen. Another possible implementation of this release event gesture is the user adding an additional finger to the touch screen beyond the one the system has been tracking thus far.

In any implementation, the system that tracks the touch screen sensors reported events, will treat the release event as a signal to exit the finger tracking mode and will, from that point forward, pass the touch information to the normal processing of the hand held device software, except that it will continue to track the touch screen event stream for the trigger event, and if so, will engage the system anew, as described above.

Embodiments include: 1. A method and system for providing an a sensory cue for the location of fingers on a touch device atop a display device. 1.1 Look for trigger event, while reverting all touch screen events to normal processing. 1.2. Grab all touch events coming from touchscreen. 1.3. For each touch event, provide a sensory cue for location of the finger or fingers upon the touch screen. 1.4. Block the touch event from further processing by the OS. 1.5. Repeat step 2 to 5 until end of release event. 1.6. Go back to step 1. 2. The method and system of embodiment 1, where the trigger event is the press of a key. 3. The method and system of embodiment 1, where the trigger event is a touch gesture. 4. The method and system of embodiment 3, where the trigger event is the touch gesture of placing two fingers on the touch screen at any location, followed by a drag of a single finger. 5. The method and system of embodiment 3, where the trigger event is a touch gesture where two fingers are swiped in vertical movement in opposite directions. 6. The method and system of embodiment 3, where the trigger event is a touch gesture where a single finger is dragged. 7. The method and system of embodiment 1, where the release event is a press of a key. 8. The method and system of embodiment 1, where the release event is a touch gesture. 9. The method and system of embodiment 8, where the release event is a touch gesture of lifting all fingers from the touch screen. 10. The method and system of embodiment 8, where the release event is a touch gesture of placing an additional finger on the touch screen in any location. 11. The method and system of embodiment 1, where the sensory cue is the displaying of a visual cursor overlay upon the normal display of the CE device in question. 12. The method and system of embodiment 11, where the visual cursor shape and/or color provides a visual indication of the exact touch surface of the finger or fingers with the touch screen, including the size and angle of the area being touched. 13. The method and system of embodiment 11, where the visual cursor is drawn using the same method that is used to render the remote display of the hand held device. 14. The method and system of embodiment 11, where the visual cursor is drawn using a secondary display device to the display device that is rendering the main remote display of the hand held device. 15. The method and system of embodiment 1, where the sensory cue is an audio sound, whose pitch, height or volume indicates to the user the relative location of his/her finger on the touch screen. 16. The method and system of embodiment 1, where the sensory cue is a haptic indication of the location of the finger or fingers on the touch screen.

Certain embodiments of the present invention are now described in detail.

In one typical embodiment, computer software added to the conventional CE device code reads touch events created by the touch screen hardware and, based on suitable gesture detection and event relay logic, notifies higher layers of code that a touch, a swipe or other gesture has been received. In this typical embodiment, this gesture detection and event relay logic may be expanded to include detection of a trigger event and of a release event as described herein.

Figure 3A:
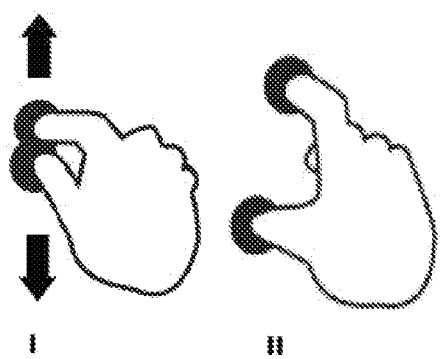
FIG. 3a is a simplified pictorial illustration of a gesture applied to a touch screen which includes putting two fingers on the touch screen and swiping both fingers, e.g. vertically, typically in opposite directions to one another, the gesture being particularly but not exclusively suited to use as an engagement event.
Figure 3B:
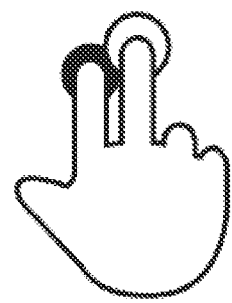
FIG. 3b is a simplified pictorial illustration of a gesture applied to a touch screen which includes a press on the touch screen and a typically simultaneous tap with another finger, the gesture being particularly but not exclusively suited to use as an engagement event.
Figure 3C:
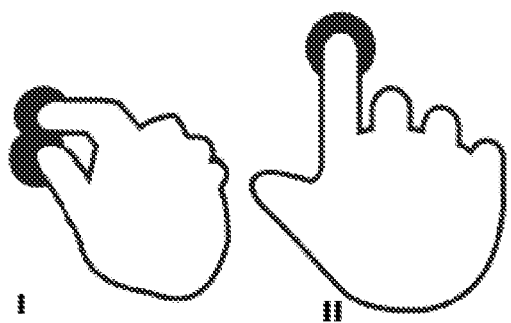
FIG. 3c is a simplified pictorial illustration of a gesture, particularly but not exclusively suited to use as a trigger event, applied to a touch screen which includes putting two fingers on the touch screen, and then lifting one finger, while continuing to apply the other finger to the screen.

The trigger event may be effected using one of the sensors embedded in the CE device: a. In one embodiment, this trigger event might be pressing of an additional key designated for this function in a specific context (such as volume, or camera keys in the context of remotely displaying the screen content on an external screen) on the hand held CE device. b. In another embodiment the trigger event may comprise a touch gesture such as the following touch gesture: putting two fingers on the touch screen, and then lifting one finger, while continuing to press the other finger onto the touch screen. This trigger event is also termed herein "rice-picking". An example of this gesture is illustrated in FIG. 3c. An example method for detecting this gesture may include some or all of the steps of the method of FIG. 5, suitably ordered e.g. as shown. c. In another embodiment the user might trigger other sensors present in the CE device in order to enter the hovering mode, for example by doing actions like shaking the device, emitting some sound, or blocking the light detector of the CE device, which might signal entry into the hovering mode. d. In other embodiments, the gesture comprises putting a single finger on the touch screen. This embodiment is very easy for the user, but requires the user to keep in mind the different meaning of a touch gesture when using a remote display as opposed to otherwise e.g. as opposed to during normal interaction with the CE device, since in the latter mode, placing a finger on a touch display is reserved for a different action (click, swipe or drag) in many existing touch user interface embodiments. e. In still another embodiment, the trigger event gesture may comprise a "swiping" gesture including, e.g. putting two fingers on the touch screen and swiping each one horizontally in opposite directions to each other (e.g. as illustrated in FIG. 3a). This embodiment has the advantage of not requiring additional keys on the CE device while at the same time not requiring changing the meaning of common gestures commonly used in touch base user interfaces. Any suitable conventional swiping gesture detection methodology may be employed to detect the "swiping" gesture as illustrated in FIG. 3a.

In another embodiment the trigger even comprises a gesture of putting one finger (or more) in a dedicated or reserved location on the screen (e.g., one of the corners or a specific one of the 4 corners); placing the finger in any other place will not trigger reverting to the hovering mode. Typically, a corner or side location is selected to be reserved for triggering, since the middle locations are very frequently used in native interfaces hence may cause an unacceptable level of ambiguity hence interfering with or detracting from the user experience. If a location or gesture selected to be reserved for (say) triggering is apt to cause ambiguity because it is needed also for the native interfaces, the triggering event (say) may be defined as a combination of location and gesture. So, for example, a triggering event might be defined as a gesture as in FIG. 3a, which is effected in a location 5 pixels or less from any corner of the screen, or a release event might be defined as a gesture as in FIG. 3b, which is effected in a location 10 pixels or less from the left edge of the screen.

Once the trigger event has been received by the CE's operating system, a sensory cue is provided to represent the location of the interaction element/s e.g., finger/s on the native interface (e.g. spatial domain represented by the CE device's touch screen). This may be done by the program code creating a sensory stimulus for the hand held device user which represents the location of and optionally other attributes of, the finger or fingers of the user on the touch screen.

In one embodiment, the sensory stimulus is visual, e.g., a visual cursor is superimposed on top of the display, which corresponds to the location of the finger or fingers on the touch screen display. In some embodiments the visual cursor might be translucent, thus allowing the display underneath to be visible, or it might be opaque. The visual cursor might have any shape, (such as but not limited to a cross, a hand, an arrow, a point, or a circle).

The visual cursor may be drawn using the same technology that is used to draw the remote display, e.g., the system may instruct the module of the software of the hand held CE device that is responsible to draw the screen, to overlay the visual cursor on top of the display. In such an embodiment the cursor may be displayed by whatever technology is drawing the remote display, such as but not limited to a pico projector, video streaming or HDMI output. In one embodiment the visual cue will be visible on the primary display of the CE device, while in another embodiment it will be visible only on the external display.

According to one embodiment, the CE device's touch screen's inherent sensor may report additional information, in addition to the location of the finger or fingers on the touch screen. Such information can include, for example, the size of the finger press and/or the angle of the finger e.g. relative to the axes of the CE device's touch screen. This additional information can be used to display a visual cursor whose characteristics e.g. shape and/or size and/or color change to reflect the pressure and/or angle of the finger on the touch screen.

In another possible embodiment, the sensory stimulus may be auditory. Once in hovering mode, the CE device may generate a sound, whose properties such as pitch, tempo or volume change in response to the location of the finger on the touch screen.

As an example, one possible embodiment may encode the distance of the finger from the top of the touch screen in the pitch of the sound, while the distance from the left-most side of the screen is encoded in the volume of the sound. For example, pressing a finger on the left top corner of the screen may produce a low volume high pitched sound, pressing a finger on the right bottom corner of the screen may produce a high volume low pitched sound, and moving the finger along the touch screen diagonal may raise the sound volume and lower its pitch, or vice versa, accordingly.

In yet another embodiment, the sensory stimulus is haptic—once engaged, the system uses a mechanical vibrator built into the hand held CE device to convey, via haptic feedback, the location of the finger on the touch screen.

As an example, one possible embodiment may encode the location of the finger on the touch screen, as a sequence of pairs of vibrations, separated by a pause. The length of the first vibration corresponds to the distance of the finger from the top of the touch screen, whereas the length of the second vibration that follows in the set corresponds to the distance of the finger from the left most side of the touch screen.

For example, holding the finger on the top left (say) corner of the touch screen may result in a sequence of two long successive vibrations followed by pause, where sliding the finger towards the right most side of the screen while keeping its position relative to the top of the screen, may result in a sequence of vibrations including pairs of relatively long and short vibrations respectively, each followed by a pause—the first long vibration indicating that the finger is at the top of the screen, and remains generally uniform. The second vibration gets shorter and shorter as one moves one's finger as described, indicating that the finger position is approaching the right most side of the touch screen.

Other embodiments may use any suitable combination of the various sensory inputs described above.

Figure 4A:
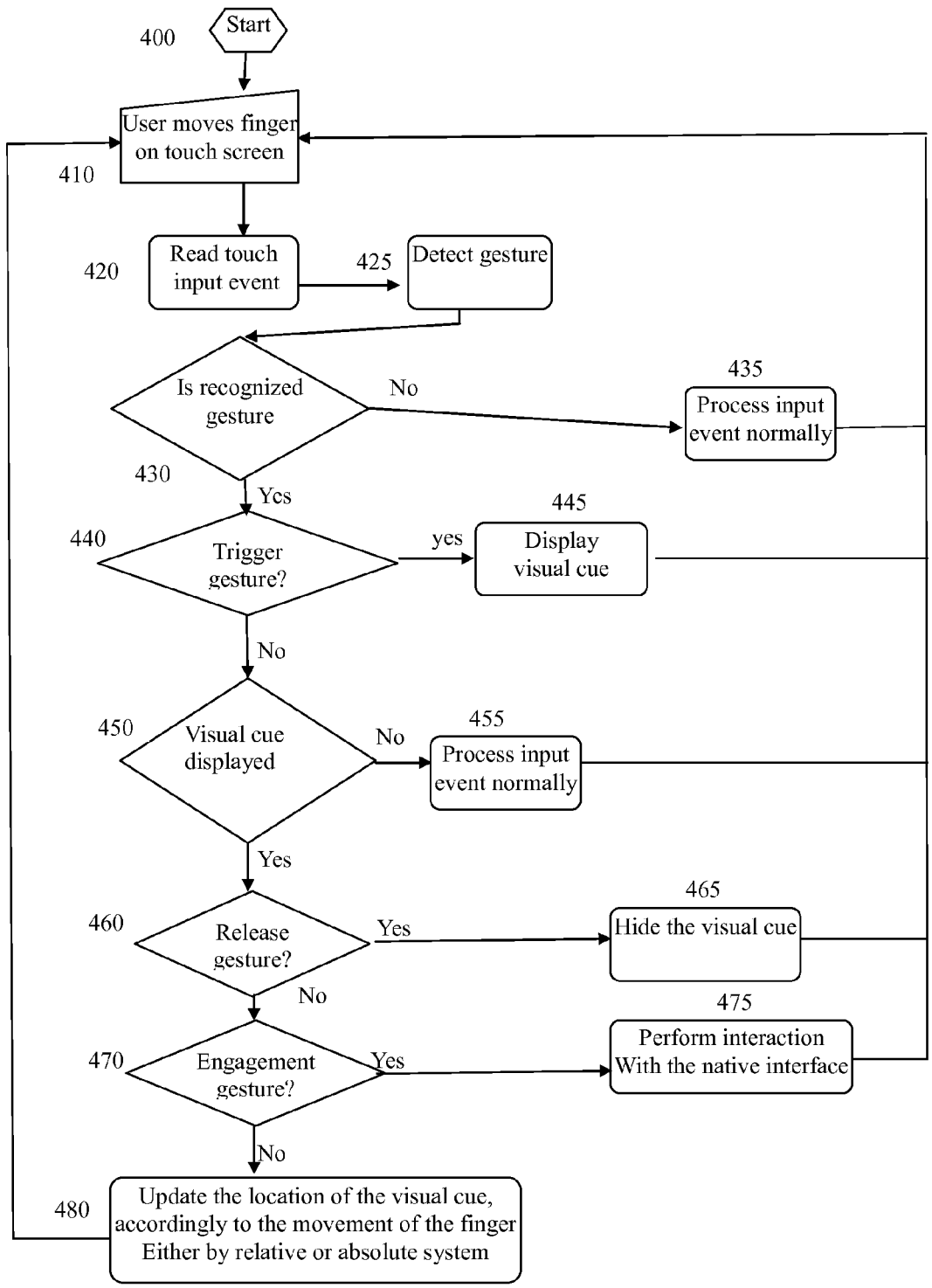
FIG. 4a is a simplified flowchart illustration of a dual mode method of operation for providing a sensory cue representing an interaction with a Touch Screen Based Interface and for normal operation with the touch screen, according to a first embodiment of the present invention.
Figure 4B:
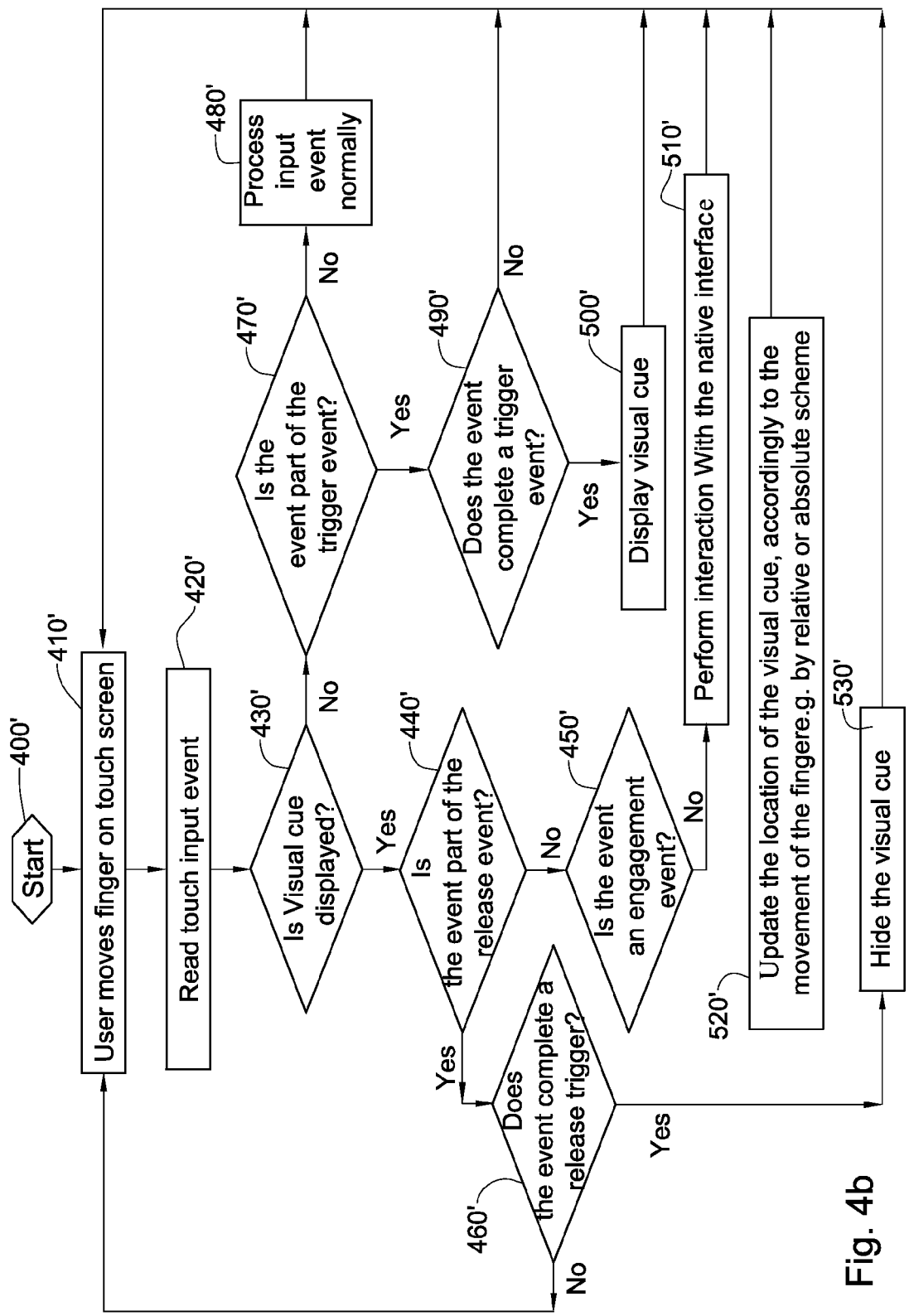
FIG. 4b is a simplified flowchart illustration of a dual mode method of operation for providing a sensory cue representing an interaction with a touch screen based interface and for normal operation with the touch screen, according to a second embodiment of the present invention.

FIGS. 4a and 4b are simplified flowchart illustrations of dual mode methods of operation for providing a sensory cue representing an interaction with a touch screen based interface and for normal operation with the touch screen, according to first and second embodiments of the present invention respectively. According to a preferred embodiment of the present invention, all functionality provided in accordance with embodiments of the present invention is performed by and resides in software on the hand held device. However, alternatively, some or all functionality may reside in remote locations e.g. in the control apparatus for the remote display.

The hovering mode is now described, i.e., how the user moves the interacting elements according to certain embodiments:

In one, "absolute", embodiment, the way of moving the element/s e.g. finger/s may be called absolute movement. When the sensory cue is first provided, it will be provided in the location where the finger touched the touchscreen when entering the hovering mode. For example if the finger touched the upper left corner, then this will be the location at which the sensory cue will be given (for example, at which the red circle (e.g.) will be drawn).

This may be true during the movement of the finger on the touchscreen—at every moment the sensory cue will be displayed in the exact location of the finger, such that if the finger moves to the bottom right corner on the touchscreen, the visual cue will accordingly move to the bottom right corner on the external display.

In another, "relative" embodiment, the way of moving the element/s e.g. finger/s may be called relative movement. In this scheme, the relation between the point touched on the screen and the location of the sensory cue is determined "contextually" i.e. relative to the stored location of the sensory cue, which was stored from the sensory cue's previous movements. In this scheme, the relation between the point touched on the screen and the location of the sensory cue typically relies on the previous movements of the interaction element/s e.g. finger/s For example, moving the finger from the left border of the touchscreen to its right border may only move the sensory cue a quarter of the screen, such that two such left to right swipes are needed so that the sensory cue may move the whole screen. Typically the sensory cue location is preserved between the two swipes for a short period of time.

After moving the interaction element to the desired place (for example above the button that the user wants to click), typically the user of the hand held device may want to interact with the CE device native interface (such as click a button or perform a drag or pinch operation).The user may instruct the system that such interaction is wanted, by effecting an event termed herein an "engagement event" such as but not limited to a mouse click.

In one embodiment there is no engagement event. Instead, the manner of the interaction with the CE device native interface will be slightly changed, to generate uniqueness recognizable by the CE device's operating system, in that placing a finger on the screen will cause a visual cue to appear at the finger-identified location, instead of causing interaction with the button at the finger's location on the screen. For example: a. clicking of a button on the touch screen, as part of the touchscreen, will be effected by placing an additional finger on the touch screen while holding still a finger which moves a virtual interaction apparatus on the screen. The virtual interaction apparatus may include any virtual device (e.g. mouse cursor, visual cue such as red dot, etc.) which a user may use to perform interaction with the interface. The virtual device typically has a visible representation which may be the same as the visual cue described herein. b. alternatively, a special physical button, or button combination (such as volume or camera buttons on the CE), may be pressed. This may require a user to adjust to a different mode of interacting with the underlying native interface.

Typically, a user may press such a physical button which the CE device when in hovering mode interprets differently than when the CE device is in its normal mode. For example when in its normal mode, a CE device may opens its camera application when the "camera" physical button is pressed. However when in hovering mode, the CE device may interpret the camera button press by the user as an engagement event as described herein and may effect a suitable interaction with a native interface such as, say an IPHONE® desktop. So, when in hovering mode, the CE device may respond to a camera button press by opening a game application whose icon lies below the visual cue's (e.g. red dot's) location when the camera button is pressed. Or, if due to previous operation in normal mode, the game environment of, say, the IPHONE® has been entered, and a shooting game has been initiated, then the CE device, when in hovering mode, may respond to a camera button press not by opening the camera application but instead by "shooting" at the touch screen location which lies below the visual cue's (e.g. red dot's) location when the camera button is pressed.

In another embodiment the engagement event comprises a timed window which initiates when a release event occurs, for performing the interaction with the CE device native interface in a conventional way. In the timed window, the system may remember, for a certain period of time, the location of the interaction element/s e.g. finger/s, and when the user performs an interaction (such as a tap on a screen for clicking a button) within the timed window, the interaction may be applied to the stored location on the screen of the interaction element/s e.g. finger/s rather than being applied to the location at which the user actually performed the interaction. Entering the timed window is triggered by performing a release event.

In one embodiment, this release event may be the pressing of some key on the hand held CE device, that is dedicated to the release function, at least in this context.

In another embodiment, a particular touch screen gesture may be interpreted as the release event. The gesture can either be a unique gesture not used in other applications, e.g. "rice-picking" as shown in FIG. 3c herein, or be "reserved" in that the user knows he is not allowed to use them except to designate a release event.

One possible embodiment of this release event gesture may be lifting all fingers off the touch screen. Another possible embodiment of this release event gesture is the user adding an additional finger to the touch screen beyond the one the system has been tracking so far.

In any embodiment, the inherent module within the CE device that tracks the touch screen sensors' reported events, may treat the release event as a signal to exit the hovering mode, and may, from that point forward, relay the touch information to the normal processing of the hand held device software, except that it may continue to monitor or track the touch screen event stream for the trigger event, and upon encountering such, will transmit the CE operating system into the hovering mode.

Typically, for a release event, touch screen location is not relevant whereas as for an engagement event, touch screen location is relevant and is typically determined before the gesture constituting the engagement event occurs e.g. by suitable prior positioning of the visual cue. For a trigger event too, touch screen location is typically relevant.

According to an embodiment of the present invention, a generic software package is provided that may be available through an SDK (Software development kit) such that an application developer will have options such as but not limited to some or all of the following: choosing whether the hovering mode will be enabled or not in his application, choose the way that the trigger event and the release events are done, for example assign a gesture to each event, and choose the look and feel of the visual cue and more.

Methods for analyzing the touchscreen movement events operative in accordance with certain embodiments of the present invention are illustrated in FIGS. 4a-4b; it is appreciated that some or all of the illustrated steps, suitably ordered e.g. as shown, may be provided.

Figure 5:
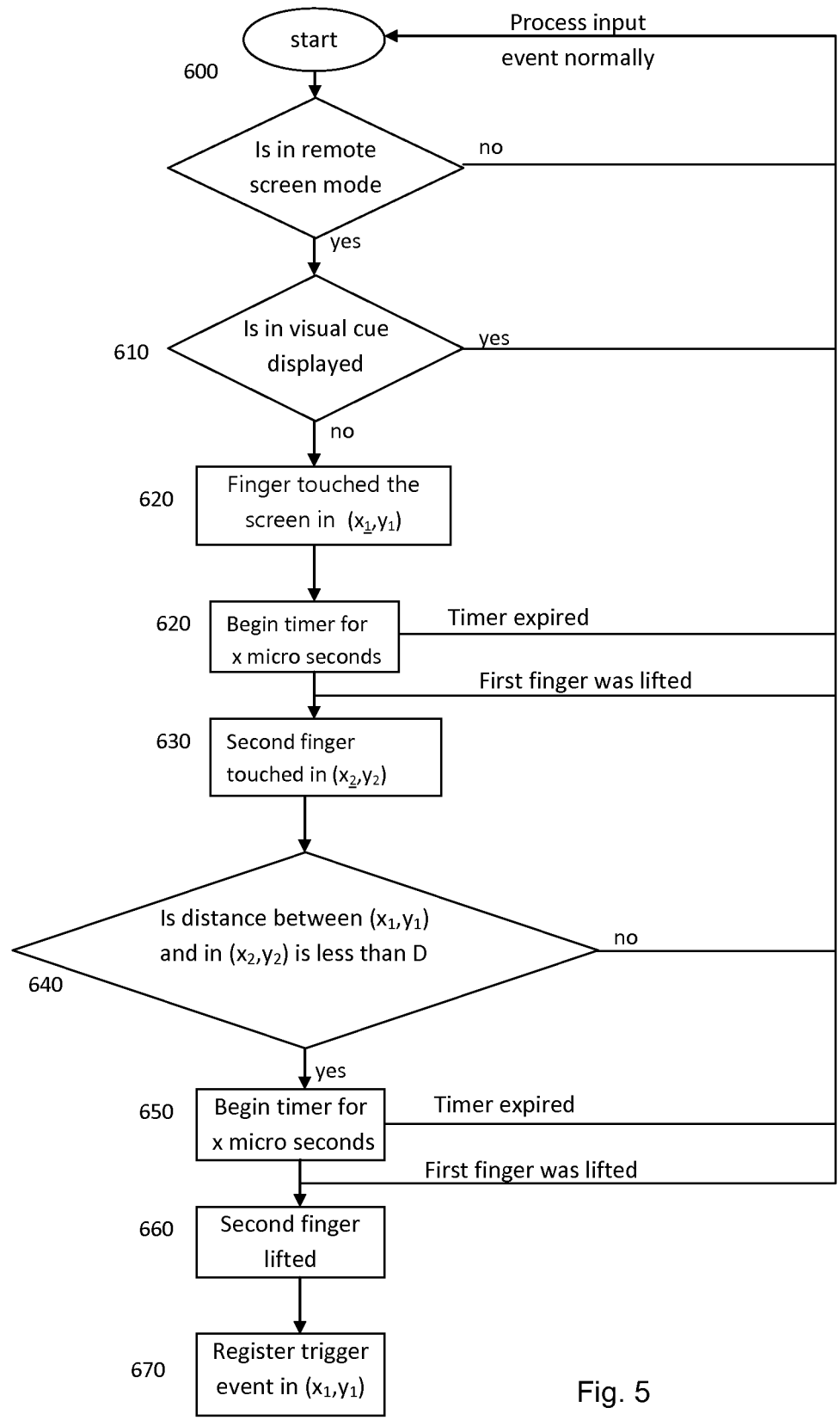
FIG. 5 is a simplified flowchart illustration of a method for detecting a "rice-picking" gesture.
Figure 6:
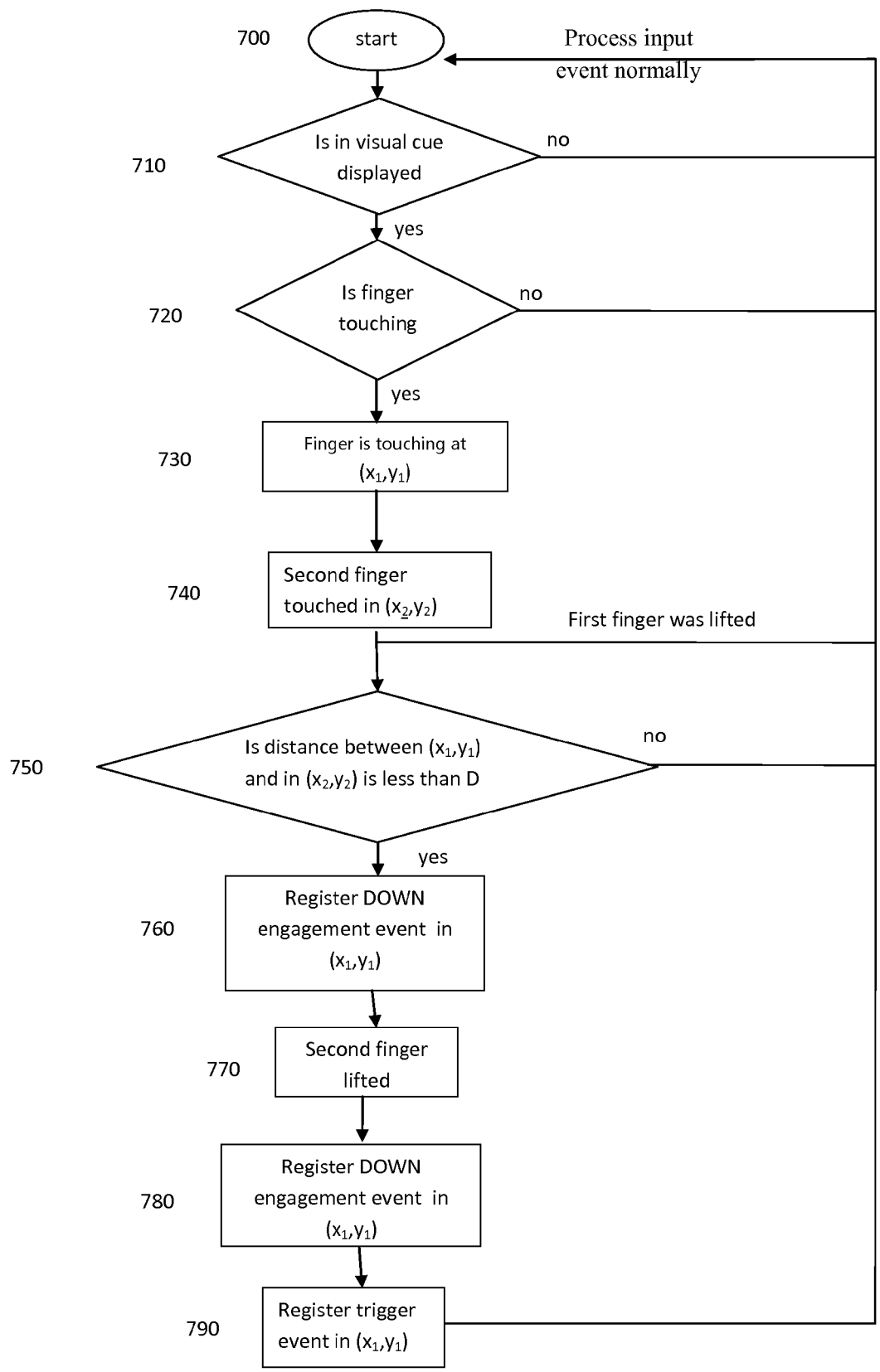
FIG. 6 is a simplified flowchart illustration of a method for detecting a tapping gesture.

FIG. 5 is a simplified flowchart illustration of an example method for performing the gesture detection step 425 of FIG. 4a, for a "rice-picking" gesture e.g. as shown in FIG. 3c. FIG. 6 is a simplified flowchart illustration of an example method for performing the gesture detection step 425 of FIG. 4a, for a tapping gesture e.g. as shown in FIG. 3b.

Referring now to FIG. 4b, it is appreciated that generally, a gesture serving as a trigger (or release) event may comprise more than one part, e.g. may itself comprise a sequence of more than one gesture, for example, as shown in FIG. 3a: A 1st gesture or first part, as indicated by sketch I—touching the screen with two fingers; followed by a 2nd gesture or second part, as indicated by sketch II—swiping the fingers in opposite directions. When this is the case, the gesture is "completed" if both or all gestures in the sequence are performed by the user and detected by the system, which then proceeds under the assumption that a trigger (or release) event has occurred. In a 2-gesture sequence, for example, gesture detection includes detecting the start of the first gesture in the sequence, tracking from the start of the first gesture until its termination, and then detecting the final part i.e. the second gesture in the sequence, in the same manner. A time period may be pre-defined to indicate the maximum amount of time which may elapse from when the first gesture finishes till when the second gesture starts.

It is appreciated that any of the gestures described herein may be used, e.g. as per a predetermined scheme, either as a trigger event triggering a move from normal mode to hovering mode (as a result of which move, typically, a visual cue or other indicator appears e.g. on the displaying screen); or as a release event triggering a move from hovering mode to normal mode (as a result of which move, typically, the visual cue or other indicator disappears e.g. from the displaying screen), or in fact as a "toggle" serving both as a trigger event and as a release event. Any event e.g. gesture described herein as a trigger event may also serve, alternatively or in addition, as a release event, and vice versa. Typically, a trigger event is selected to be a gesture which terminates in the presence of only a single finger on the screen, e.g. the gesture of FIG. 3c, since if this is the case, the position of the visual cue is clearly determined by the position of the sole finger remaining on the screen as the gesture terminates. Alternatively, a trigger event is selected to be a gesture which terminates in the presence of more than a single finger on the screen, e.g. the gesture of FIG. 3a. If this is the case, the position of the visual cue is determined by the position of a predetermined one of the more than one finger(s) remaining on the screen as the gesture terminates, such as the finger closer to the top and/or right of the screen.

Typically, gestures e.g. as described herein are utilized as trigger and/or release events, whereas engagement events may, for example, comprise clicking a virtual button on the touch screen, responsive to which the interaction indicated by the virtual button is carried out, at the location indicated by the visual (say) cue.

It is appreciated that any suitable scheme may be used to map a change of position of the finger (e.g.) on the touch screen, to a change of position of the visual cue on the screen being used to display.

For example, according to a first, "absolute" embodiment of the invention: a. the initial position of the visual cue on the displaying screen is exactly that of the finger on the touch screen, suitably scaled to take into account difference in size between the two screens; and b. Each delta-x, delta-y move of the finger on the touch screen is represented by a scaled delta-X, delta-Y move of the visual cue on the displaying screen, where delta-X, delta-Y are derived from delta-x, delta-y e.g. again simply by scaling to take into account difference in size between the two screens.

However, according to a more general, "relative" embodiment of the invention, a. the initial position of the visual cue on the displaying screen may be a predetermined position unrelated to the initial position of the finger on the touch screen, e.g. the middle of the screen; and/or b. Each delta-x, delta-y move of the finger on the touch screen is represented by a scaled delta-X, delta-Y move of the visual cue on the displaying screen, where the factors by which delta-X, delta-Y differ respectively from delta-x, delta-y are not simple scaling factors which take into account difference in x and y dimensions between the two screens. Instead, each of these factors is a pre-determined parameter; these pre-determined parameters may be termed the x-velocity and y-velocity of the visual cue and they determine whether the visual cue will "zoom across the displaying screen" responsive to even a tiny motion of the finger (e.g.) on the touch screen, or conversely whether the finger may even need to traverse the entire width or length of the touch screen several times in order to cause the visual cue to move from one side of the displaying screen to the other.

Optionally, the image shown on the large screen may be formed as follows: a. use native PDF application which is provided today as part of the handheld, to generate bits for display which represent the desired image on the large screen other than the image of the visual cue; and b. superimpose onto these bits, additional bits representing the visual cue e.g. red dot A particular advantage of this option is that the above method is not adversely affected by the size of the PDF file required to represent the image on the large screen.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry® GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

What is claimed is:

1. A method for interacting with a touch screen based hand held device, the method being operative in conjunction with an external digital display having a gazed-at display screen, the method including:

in a first, normal, default mode of operation, sensing a user's interactions with the touch screen based hand held device and modifying a display on the touchscreen based hand held device accordingly;

in a second, hovering, mode of operation, triggered by a trigger event and terminated by a release event:

sensing the user's interactions with the touch screen based hand held device;

generating a representative display of the user's interactions superimposed an image displayed on the external digital display; and detecting at least one predetermined triggering or releasing touch event generated by the user's interaction with the touch screen representing a touch gesture, including simultaneous actions of at least two fingers at any location on the touch screen not at relating a specific object on the screen, wherein each finger movement has a different pattern, such as the gesture is differentiated from zoom or pinch gesture, including at least one of:

pressing on the touch screen and a typically simultaneous tap with another finger, putting two fingers on the touch screen and then lifting one finger, while continuing to apply the other finger to the screen, placing two fingers on the touch screen at any location, followed by a drag of a single finger; and selecting between hovering mode and normal mode based on detected triggering or releasing gesture.

2. The method according to claim 1 wherein said generating a representative display includes providing an indication, on a display device controlling the gazed-at screen, of at least one finger location on the touch screen based hand held device thereby allowing a user to generate touch screen events which control the display device's display output.

3. The method according to claim 1, where the release event comprises a press of one of the CE device physical buttons.

4. The method according to claim 1, wherein generating a representative display comprises displaying a visual cursor overlay upon the normal display of the CE device in question which is visible on the external gazed at surface.

5. The method according to claim 4, where the CE device comprises a smart phone.

6. The method according to claim 4, where the CE device comprises a media player.

7. The method according to claim 1, where the visual cursor is drawn by the apparatus used to render the remote display of the hand held device.

8. The method according to claim 7, wherein said characteristic of the visual cursor includes the shape thereof.

9. The method according to claim 7, wherein said characteristic of the visual cursor includes the color thereof.

10. The method according to claim 7, wherein said characterization of the touch surface includes the size thereof.

11. The method according to claim 7, wherein said characterization of the touch surface includes the angular orientation thereof.

12. The method according to claim 1, where the visual cursor is drawn using a display device which is additional to the display device rendering the main remote display of the hand held device.

13. The method according to claim 1, wherein generating a representative display comprises generating an audio sound, sensible to the user, of the at least one characteristic of which indicates to the user the relative location of his finger on the touch screen.

14. The method according to claim 1, wherein generating a representative display comprises generating a haptic indication, sensible to the user, of the location of at least one finger on the touch screen.

15. The method according to claim 14, wherein said characteristic includes at least one of: pitch, height and volume.

16. The method according to claim 1 wherein said location of at least one finger comprises locations of each of a plurality of fingers upon the touch screen.

17. The method according to claim 1 wherein said generating a representative display includes providing an indication, on a display device controlling the gazed-at screen, of at least one finger location on the touch screen based hand held device thereby allowing a user to generate touch screen events which control the display device's display output.

18. The method according to claim 17, wherein said providing an indication occurs only responsive to a trigger event initiated by the user of the touch screen.

19. The method according to claim 17, and also comprising sniffing for the trigger event while passing all touch screen events, other than the trigger event, for touch screen event processing toward modification of the display output.

20. The method according to claim 19, and also including, responsive to said trigger event, grabbing all touch events generated by the user on the touch screen during a time period, and for each of said touch events, providing a sensory cue for location of at least one finger upon the touch screen.

21. The method according to claim 19, and also including, responsive to said trigger event, blocking all touch events generated by the user on the touch screen during a time period, for touch screen event processing toward modification of the display output.

22. The method according to claim 21, wherein the time period terminates upon occurrence of a release event.

23. The method according to claim 22, wherein said release event comprises at least one touch screen event representing a touch gesture in which the user touches the touch screen.

24. The method according to claim 1 wherein said operative action comprises a selected one of a range of predetermined operative actions.

25. The method according to claim 1 wherein said sensing includes detecting a gesture in which a plurality of fingers contact the touchscreen and, within a predetermined time interval, some of the plurality of fingers are removed from the touch screen whereas others of the plurality of fingers remain in contact with the touch screen.

26. The method according to claim 1 wherein the representative display comprises a visual cue indicative of location of the user's interaction and wherein an initial position of the visual cue on the first image is exactly the initial position of the user's interaction on the touch screen, suitably scaled to take into account difference in size between the touch screen and the gazed-at screen.

27. The method according to claim 1 wherein the representative display comprises a visual cue indicative of location of the user's interaction and wherein an initial position of the visual cue on the first image is predetermined irrespective of the initial position of the user's interaction on the touch screen.

28. The method according to claim 27, wherein the visual cue moves in each dimension to exactly reproduce the user's motions over the touchscreen, scaled to take into account difference in size between the two screens.

29. The method according to claim 28, wherein the visual cue moves in each dimension to exactly reproduce the user's motions over the touch screen, scaled by predetermined visual cue speed factors irrespective of difference in size between the two screens.

30. The method according to claim 1, wherein said hovering mode of operation is implemented in an Android system.

31. The method according to claim 1, wherein said second, hovering, mode of operation is implemented on a Wi-Fi display.

32. The method according to claim 31, wherein an underlying view receives an onHoverEvent if an appropriate Listener is registered with the Android system.

33. The method according to claim 1, wherein software functionality residing in the hand-held device implements said second, hovering, mode of operation.

34. A system for interacting with a touch screen based hand held device application, the system being operative in conjunction with an external digital display having a gazed-at display screen, on which a first image is provided which is based on another image produced by a touch screen based hand held device, the system interacting with a native interface operative, in a first, normal, default mode of operation of the hand held device, for sensing a user's interactions with the touch screen based hand held device and modifying a display on the touch screen based hand held device accordingly, the system comprising:
virtual hovering apparatus operative, in a second, hovering, mode of operation of the hand held device, triggered by a trigger event and terminated by a release event, for sensing the user's interactions with the touch screen based hand held device and generating a representative display of the user's interactions superimposed on the first image;
wherein the triggering and release events are touch events generated by the user's interaction with the touch screen representing a touch gesture, including simultaneous actions of at least two fingers, wherein at least one action is continuous, such as the gesture is not unintentional, including at least one of: putting two fingers on the touch screen and swiping both fingers, pressing on the touch screen and a typically simultaneous tap with another finger, putting two fingers on the touch screen, and then lifting one finger, while continuing to apply the other finger to the screen, placing two fingers on the touch screen at any location, followed by a drag of a single finger.

35. A computer program product, comprising a computer usable medium having a computer readable program code embodied therein, said computer readable program code adapted to be executed to implement a method for interacting with a touch screen based hand held device application, the method being operative in conjunction with an external digital display having a gazed-at display screen, on which a first image is provided which is based on another image produced by a touch screen based hand held device, the method including:
in a first, normal, default mode of operation, sensing a user's interactions with the touch screen based hand held device and modifying a display on the touch screen based hand held device accordingly;
in a second, hovering, mode of operation, triggered by a trigger event and terminated by a release event:
sensing the user's interactions with the touch screen based hand held device;
generating a representative display of the user's interactions superimposed on the first image; and
detecting at least one predetermined touch event generated by the user's interaction with the touch screen representing a touch gesture, including simultaneous actions of at least two fingers, wherein at least one action is continuous, such as the gesture is not unintentional, including at least one of: putting two fingers on the touch screen and swiping both fingers, pressing on the touch screen and a typically simultaneous tap with another finger, putting two fingers on the touch screen, and then lifting one finger, while continuing to apply the other finger to the screen, placing two fingers on the touch screen at any location, followed by a drag of a single finger; and
selecting between hovering mode and normal mode based on detected gesture, wherein at least one gestures indicates to select the normal mode and at least a second gesture indicates to select hovering mode.

* * * * *